(12) United States Patent
Ding et al.

(10) Patent No.: US 8,334,347 B2
(45) Date of Patent: Dec. 18, 2012

(54) COMPOSITIONS FOR MULTILAYER COATING AND RESINS THEREFORE

(75) Inventors: Hong Ding, Hudson, OH (US); Zhicheng Li, Solon, OH (US); Weilin Tang, Solon, OH (US); Ganesh S. Desai, Solon, OH (US); Thomas J. Staunton, Euclid, OH (US); Brian J. Wayton, Medina, OH (US); Heather N. Becker, Valley City, OH (US); Prabhjot K. Sahota, Hudson, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 12/703,408

(22) Filed: Feb. 10, 2010

(65) Prior Publication Data

US 2010/0203251 A1 Aug. 12, 2010

Related U.S. Application Data

(60) Provisional application No. 61/151,303, filed on Feb. 10, 2009.

(51) Int. Cl.
*C08G 63/00* (2006.01)
(52) U.S. Cl. .................. 525/440.13; 525/411; 525/415; 525/440.01

(58) Field of Classification Search .................. 525/411, 525/415, 440.01, 440.13
See application file for complete search history.

(56) References Cited

U.S. PATENT DOCUMENTS

| 4,533,703 | A | | 8/1985 | Kordomenos et al. | |
|---|---|---|---|---|---|
| 4,801,663 | A | * | 1/1989 | Ueyanagi et al. | 525/528 |
| 6,096,835 | A | | 8/2000 | Vandevoorde et al. | |
| 6,143,367 | A | * | 11/2000 | Bartol et al. | 427/388.2 |
| 2005/0019600 | A1 | | 1/2005 | Choi et al. | |
| 2005/0277732 | A1 | * | 12/2005 | Yu et al. | 524/589 |

OTHER PUBLICATIONS

Eastman, CAB-551-0.2 Product Data Sheet, p. 1-2, Aug. 22, 2006.*

* cited by examiner

*Primary Examiner* — David W Wu
*Assistant Examiner* — Robert Jones, Jr.
(74) *Attorney, Agent, or Firm* — Deron A. Cook; Robert E. McDonald; Eryn Ace Fuhrer

(57) ABSTRACT

A 2K basecoat clearcoat system includes a solvent borne basecoat having a low Tg branched polyester polyol, optionally, a high Tg, high molecular weight thermoplastic resin, and a hardener that includes an isocyanate functional material suitable for crosslinking the polyester polyol, and optional thermoplastic resin. The solvent borne clearcoat composition includes a low Tg linear or branched polyester polyol, at least one other multi-functional polyol, and an isocyanate functional material suitable for crosslinking the polyester and multi-functional polyols.

13 Claims, No Drawings

COMPOSITIONS FOR MULTILAYER COATING AND RESINS THEREFORE

This application claims priority to U.S. Provisional Patent Application 61/151,303 filed on Feb. 10, 2009, the entirety of which is incorporated herein by reference.

The present invention pertains to basecoat/clearcoat systems and resins therefore, and more particularly, basecoat/clearcoat systems useful for OEM and refinish aerospace applications.

Multilayer coating systems comprising one or more layers of a pigmented basecoat covered by one or more layers of a clearcoat are well known, particularly in the automotive industry. However, such existing basecoat/clearcoat systems may not be well suited for aerospace applications. In part the challenge of developing a basecoat clearcoat system for aerospace is due to the extensive use of aluminum substrates, which, due to the relative flexibility of aluminum as compared to steel, requires a more flexible coating system. Also challenging to the use of conventional basecoat clearcoat systems in aerospace applications is the exposure that exterior substrates has to extreme temperature variations (from −50° C. to over 60° C.), high winds (over 300 mph) and associated precipitation, and corrosive liquids, such as hydraulic fluid, aviation fuel, deicing fluids and the like.

Aerospace applications can also present challenges related to the often tremendously large surfaces that need to be coated. Basecoat and clearcoat compositions, and particularly 2 component (2K) isocyanate cured coatings, must have a sufficiently long pot-life to allow coating a very large substrate, without having the coating vitrify in the applicator. However, there is considerable interest in having coatings that dry relatively quickly so as to facilitate timely application of subsequent layers, particularly in situations where one color layer is to be applied atop another contrasting color layer. Despite the desirability of fast dry times, it is also desirable that the layers have good inter-coat adhesion where there is a delay between application of one layer and subsequent application of a second layer. If the first layer vitrifies too quickly, subsequently applied layers may not adhere, resulting in delamination. It would be desirable to provide a multilayer coating system in which the clearcoat can be applied to the basecoat as much as 72 hours after application of the basecoat, while maintaining excellent overall cure, performance and intercoat adhesion.

The present invention provides a multilayer, ambient cure coating system comprising a pigmented 2K polyurethane basecoat composition and a 2K clearcoat composition that demonstrate excellent intercoat and substrate adhesion and solvent and water resistance. Some embodiments of the basecoat clearcoat system described herein balance flexibility and cure rate resulting in excellent overall performance even when the clearcoat is applied up to 72 hours after application of the basecoat. The invention also describes novel polyester polyol resins useful as a resin in a basecoat formulation of the system described.

Exemplary basecoat compositions of the present invention are 2K solvent borne blends comprising, in one embodiment:
(a) A resin system comprising a low Tg branched polyester polyol;
(b) an isocyanate functional material suitable for crosslinking the polyester polyol; and
(c) optionally, one or more pigments.

In some embodiments of the basecoat composition, the resin system may consist essentially of the low Tg branched polyester polyol.

In another embodiment, the resin system may additionally include a high Tg, high molecular weight thermoplastic resin selected from thermoplastic acrylic resins, cellulose esters, and blends thereof.

In another embodiment, the resin system may still further comprise one or more thermoset acrylic resins, which may, in some embodiments, be present in amounts up to about 70% with respect to total resin weight. In some embodiments, the thermoset acrylic resin may be added to the basecoat composition as part of a pigmented toner resin.

The basecoat composition may further comprise a catalyst for the isocyanate polyol reaction, which may be a metal catalyst, such as dibutyltin dilaurate.

According to another embodiment, a 2K solvent borne basecoat composition may comprise:
(a) a mixing clear component comprising:
  (i) a low Tg branched polyester polyol;
  (ii) a high Tg, high molecular weight thermoplastic resin selected from a thermoplastic acrylic resin, a cellulose ester, and blends thereof;
(b) a hardener component comprising an isocyanate functional material suitable for crosslinking a polyester polyol of the mixing clear component; and
(c) optionally, one or more pigmented toner resins.

In a particularly useful embodiment, the branched polyester polyol may comprise the esterification reaction product of a monomer blend comprising:
(a) a linear, difunctional glycol or ester glycol, which may be exemplified by HPHP and NPG;
(b) a cyclic diol exemplified by 1,3-CHDM, 1,4-CHDM, and TCD diol;
(c) a multi-functional polycaprolactone; and
(d) a cyclic dicarboxylic acid or anhydride, exemplified by HHPA and CHDA.

Exemplary clearcoat compositions of the present invention are 2K solvent-borne blends comprising:
(a) a low Tg linear or branched polyester polyol or blends thereof;
(b) at least one other multi-functional polyol; and
(c) an isocyanate functional material suitable for crosslinking the polyester and multifunctional polyols.

Also described are substrates coated with a multilayer coating comprising at least one layer of a basecoat composition herein described and at least one layer of a clearcoat composition herein described.

Also taught are methods of applying a multilayer coating onto a substrate comprising the steps of:
(a) applying a first layer of a basecoat composition to the substrate, the basecoat composition comprising a blend of:
  (i) a mixing clear component comprising:
    (1) a low Tg branched polyester polyol; and
    (2) a high Tg, high molecular weight thermoplastic resin selected from a thermoplastic acrylic resin, a cellulose ester, and blends thereof;
  (ii) a hardener component comprising an isocyanate functional material suitable for crosslinking a polyester polyol of the mixing clear component; and
  (iii) optionally, one or more pigmented toner resins.
(b) subsequently applying atop a portion of the first layer of the basecoat composition, a first layer of a clearcoat composition comprising:
  (i) a resin component comprising:
    (1) a low Tg linear or branched polyester polyol or blends thereof;
    (2) at least one other multi-functional polyol, which may be a polycaprolactone tetrol; and (ii) an isocyanate functional material suitable for crosslinking the polyols.

The multilayer coating composition may be applied to a wide variety of substrates, including primed substrates. The multilayer coating system is particularly well suited for aluminum substrates, and more particularly, primed aluminum substrates.

It is noted that the present invention relates to a basecoat clearcoat system. Thus it is anticipated that the basecoat composition will be used in conjunction with the clearcoat composition to form a multilayer coating.

Basecoat Composition:

The basecoat composition comprises a polyester polyol, which is preferably a branched polyester polyol. Branched polyester polyols may be obtained by condensation of one or more polycarboxylic acids, or their corresponding anhydrides or lower alkyl (C1-C3) esters with one or more polyalcohols, where at least one of the reactant species has a OH functionality of 3 of more.

Nonlimiting examples of suitable polyacids may include phthalic acid, isophthalic acid, terephthalic acid, tetrahydrophthalic acid, tetrahydroterephthalic acid, hexahydrophthalic acid (HHPA), hexahydroisophthalic acid, hexahydroterephthalic acid, chlorendic acid, trimellitic acid, hexahydrotrimellitic acid, pyromellitic acid, 1,3 and 1,4-cyclohexanedicarboxycylic acid (CHDA), cyclohexanetetracarboxylic acid, methyltetrahydrophthalic acid, methylhexahydrophthalic acid, endomethylenehexahydrophthalic acid, methyl-endomethylenetetrahydrophthalic acid, maleic acid, fumaric acid, itaconic acid, succinic acid, glutaric acid, adipic acid, azelaic acid, sebacic acid, decanedicarboxylic acid, suberic acid, pimelic acid, dimer acid (dimer of tall oil fatty acid), tetrachlorophthalic acid, naphthalenedicarboxylic acid, 4,4'-diphenylmethanedicarboxylic acid, 4,4'-dicarboxybiphenyl, etc., as well as acid anhydrides and dialkyl esters, thereof and blends thereof.

Non-limiting examples of suitable polyalcohols may include dihydric alcohols or trihydric alcohols and blends thereof, such as ethylene glycol, propylene glycol (MPG), 1,4-butanediol, 1,3-butanediol, 2,3-butanediol, 1,2-butanediol, 1,5-pentanediol, 1,4-pentanediol, 2,4-pentanediol, 2,3-dimethyltrimethylene glycol, 3-methylpentane-1,5-diol, 3-methyl-4,5-pentanediol, 2,2,4-trimethyl-1,3-pentanediol, 1,6-hexanediol, 1,5-hexanediol, 1,4-hexanediol, 2,5-hexanediol, 1,3-cyclohexanedimethanol, 1,4-cyclohexanedimethanol, diethylene glycol, dipropylene glycol, triethylene glycol, neopentyl glycol (NPG), hydroxypivalic acid neopentyl glycol ester (HPHP), glycerol, trimethylolpropane (TMP), trimethylolethane, diglycerol, pentaerythritol, dipentaerythritol, sorbitol Bis-(hydroxymethyl)-tricyclodecane (TCD-diol) and the like. Higher functionality alcohols may also be used.

In a particularly useful embodiment, the branched polyester polyol may comprise the reaction product of a monomer blend comprising:
(a) a linear, difunctional glycol or ester glycol;
(b) a cyclic diol;
(c) a multi-functional polycaprolactone; and
(d) a cyclic dicarboxylic acid or anhydride.

Useful multi-functional polycaprolactones may include polycaprolactone polyols, including polycaprolactone triols and tetrols. In particularly useful embodiments of the invention, the caprolactone content of the monomer blend may be from about 5 to about 65% by weight, more usefully about 10 to 60% by weight and still more usefully, about 10 to 50% by weight in still other embodiments, the caprolactone content may be 15-20% by weight of the monomers and in still further embodiments 45 to 55%.

The polyester polyols may be prepared by conventional techniques. In one approach, the monomers may be charged to a suitable reaction chamber under an inert atmosphere and stirred under gradually increasing heat (for example from ambient to approx. 210° C.) while removing water, until a useful acid value has been reached, which may be less than about 5. Esterification of the monomer blend may proceed by means of a condensation reaction, with removal of the water condensation. An amount of a suitable catalyst for the esterification reaction may be used. Suitable catalysts may include conventional tin catalysts used in polyester synthesis, such as stannous octoate, stannous oleate, dibutyl tin diacetate, butyl stannoic acid and dibutyl tin dilaurate. The viscosity of the resultant polyester polymer resin may be adjusted with a suitable organic solvent such as methyl n-amyl ketone.

Useful polyester polyols for the basecoat composition of the present invention will have a molecular weight in the range of between about 500 and about 10,000, more usefully from between about 500 to about 5000, and still more usefully, between about 500 and about 3000. The polyester polyols will preferably have a low glass transition temperature (Tg), which may be in the range of between about –40° C. and 30° C. and in another embodiment, about –40° C. and 20° C. and in still another embodiment, –20° C. to 15° C., but in another embodiment, from about 0° C. to about 10° C. In particularly useful embodiments, the polyester polyol will have a hydroxyl value in the range of about 50 to about 300.

The polyester polyol will preferably have OH functionality of between about 2 and about 5 per molecule, and in some embodiments, 2.5 and about 5 and in still others, between about 3 and about 4.5.

The basecoat composition may further comprise a high Tg, high molecular weight thermoplastic resin selected from resins such as the thermoplastic acrylic resins, cellulose esters, and blends thereof. The thermoplastic resin may have a Tg greater than about 25° C., and usefully, in the range of between about 25° C. and about 110° C. In some embodiments, the Tg may be between about 25° C. and about 100° C. The molecular weight of the resin will be greater than 1000, and may usefully be in the range of about 10,000 and about 300,000, and in some embodiments, about 5,000 to about 250,000. While it is contemplated that a basecoat composition may comprise the low Tg polyester polyol as substantially the only resin in the composition, in more useful embodiments, the basecoat composition comprises a resin system that includes both the low Tg polyester polyol and thermoplastic resin.

The term thermoplastic acrylic (TPA) resin, as used herein, is meant to include those thermoplastic polymers resulting from the polymerization of one or more acrylic acid ester monomers or methacrylic acid ester monomers (collectively referred to herein as (meth)acrylic acid ester monomers). These monomers are generally represented by the formula:

wherein Y is H or CH3 and R is an alkyl group preferably comprising from 1 to about 20 carbon atoms.

Suitable nonlimiting examples of (meth)acrylic acid ester monomers useful in synthesizing the TPA resin may include methyl acrylate and methyl methacrylate, ethyl methacrylate, isopropyl acrylate, n-propyl acrylate and propyl methacrylate, n-butyl acrylate and butyl methacrylate, isobutyl acrylate and isobutyl methacrylate, 2-ethylhexyl acrylate and hexyl methacrylate, styrene and isobornyl acrylate and isobornyl methacrylate and the like, as well as reaction products and combinations comprising at least one of the foregoing. Poly(methyl methacrylate) (PMMA) is a particularly useful TPA resin in the basecoat compositions of the present invention and particularly PMMA resins having a molecular weight in the range of between about 175,000 to about 225,000.

TPA resins may also include copolymers of acrylate and methacrylate monomers. It will be understood that the basecoat compositions of the present invention may comprise blends of TPA resins.

Suitable TPA resins may be prepared by conventional techniques and the particular method of synthesis is not pertinent for purposes of this invention. TPA resins may be prepared or supplied as a solution of resin in a solvent. Useful PMMA resins are commercially available from a variety of sources.

The cellulose esters useful in this invention are typically prepared by reactions of acids or, more commonly, anhydrides with the hydroxyl groups along the cellulose polymer chain. The average number of hydroxyl groups per 4 anhydroglucose repeating units along the cellulose chain that are not esterified generally varies from 0 to about 3. Preferred are those cellulose esters having an average of 0 to about 2.5 un-esterified hydroxyl groups, and most preferred is the range of 0 to about 2. The size and type of the alkyl or aryl groups of the ester substitution may vary widely depending upon the amount of substitution, and the overall composition of the resin. There is no known limit to the size and type of the ester substitution, although the acids and anhydrides commonly utilized to react with the hydroxyl groups to form the ester groups typically contain an average of about 2 to about 12 carbon atoms. Typical acids and anhydrides useful in the preparation of cellulose esters include formic, acetic, propionic, butyric, hexanoic, decanoic, stearic, and the like. These aliphatic esters may be branched or unbranched. Typical of suitable aromatic acids and anhydrides which are useful for reaction with the hydroxyl groups are benzoic acid and phthalic anhydride. Representative examples of suitable cellulose esters include cellulose acetate, cellulose propionate, cellulose butyrate, cellulose acetate propionate, cellulose acetate butyrate, cellulose acetate phthalate, etc. Especially useful, due to its cost and availability, is cellulose acetate butyrate.

The cellulose acetate butyrate (CAB) which can be utilized in the preparation of the acid-functional polymer of this invention is a cellulose derivative which can be conveniently prepared by reacting cellulose with acetic and butyric acid or anhydride in the presence of an acid catalyst, such as sulfuric acid. Frequently, glacial acetic acid is utilized as the solvent.

The ratio of acetate and butyrate components may be varied over a wide range. The CAB materials preferably used in this invention are those wherein the range of degree of acetylization is typically 1-40 weight percent, preferably 1-20 weight percent, more preferably 1-10 percent; the butyl groups are in the range of 15-60 weight percent, preferably 30-60 percent and more preferably 40-60 percent. Typically, the remaining amount of hydroxyl groups will range from 0-10 weight percent.

CAB is commercially available and especially preferred in the practice of this invention are those products of Eastman Chemical Company sold under its "CAB" trade name, such as CAB-551-0.2 and CAB-551-0.01. The numbering designation indicates by the first two figures the approximate weight percent content of butyl groups. The third figure indicates the approximate content of the hydroxyl groups and the last figures following the hyphen indicates the viscosity in seconds of the CAB product.

In some embodiments, the basecoat composition will comprise a heterogeneous blend of at least one low Tg polyester polyol and at least one high Tg thermoplastic resin. By "heterogeneous" it is meant that the high Tg thermoplastic resin does not remain as a homogeneous mixture with the low Tg polyester polyol, but migrates to form pockets of thermoplastic resin dispersed throughout the polyester polyol.

The polyester polyol and thermoplastic resin may be packaged together as a basecoat resin system, optionally with one or more solvents and additives, which are described below. This blend may be referred to as a mixing clear component. As described in greater detail below, this mixing clear component may be blended with a separately packaged hardener component, and, optionally, one or more pigment toners, to form a selectively pigmented basecoat composition.

Particularly useful mixing clears comprise from 50 to about 100 weight percent, based on total resin weight in the mixing clear, of the low Tg polyester polyol or blend and from 0 to about 50 weight percent of the high Tg thermoplastic resin or blend. In other embodiments, the mixing clear may comprise from 80 to about 99 weight percent, based on total resin weight in the mixing clear, of the low Tg polyester polyol or blend and from 1 to about 20 weight percent of the high Tg thermoplastic resin or blend.

In some embodiments, one or more thermoset acrylic resins may be blended into the mixing clear, which may be in amounts up to about 70%, and in some embodiments 10 to 70% and in other embodiments 20%-60% with respect to total resin weight—with the remaining total resin weight substantially comprising the low Tg polyester polyol or blend of the low Tg polyester polyl and high Tg thermoplastic acrylic resin. It will be noted that all or portions of the thermoset acrylic resins may blended directly into the mixing clear or later added as a resin in a pigmented toner resin—as discussed in further detail below. The thermoset resin may have a Tg from 0 to 20, and more usefully, 1 to about 10° C. Its molecular weight may range from 2500 to 5000.

The basecoat composition will further comprise an isocyanate functional material suitable for crosslinking the low Tg polyester polyol. The isocyanate functional material may be selected from materials that are well known in the art and may include mono-, di-, tri-, and multi-functional isocyanates. Di- and tri- and higher functional isocyanates are particularly useful. Representative isocyanates will have two or more isocyanate groups per molecule and may include the aliphatic compounds such as ethylene diisocyanate, trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate and butylidene diisocyanate; the cycloalkylene compounds such as 3-isocyanatomethyl-3,5,5-trimethylcyclohexylisocyanate, and 1,3-cyclopentane diisocyanate, 1,3-cyclohexane diisocyanate, and 1,2-cyclohexane diisocyanate; the aromatic compounds such as m-phenylene diisocyanate, p-phenylene diisocyanate, 4,4'-diphenyl diisocyanate, 1,5-naphthalene diisocyanate and 1,4-naphthalene diisocyanate; the aliphatic-aromatic compounds such as 4,4'-diphenylene methane diisocyanate, 2,4- or 2,6-toluene diisocyanate, or mixtures thereof, 4,4'-toluidine diisocyanate, and 1,4-xylylene diisocyanate; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. Particularly useful in the basecoat compositions of the present invention is hexamethylene diisocyanate.

The amount of isocyanate functional material used in the basecoat composition will preferably be sufficient to provide an NCO:OH ratio of between about 0.8:1 and about 3:1, wherein the OH represents the total of the free hydroxyls of the low Tg polyester polyol(s) in combination with free hydroxyls in any other optionally added reactive hydroxyl functional resins.

As noted above, the isocyanate functional material may be packaged separately from the mixing clear component as a hardener component, to be blended with the mixing clear, and optionally, one or more pigments, to prepare the basecoat composition. The hardener package, comprising the isocyanate functional material, may further comprise one or more solvents, catalysts, and non-reactive (with the isocyanate) additives.

The basecoat composition may include an amount of one or more catalysts that catalyze the isocyanate hydroxyl reaction. Useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, 1,8-diaza-bichloro[5,40]-undecene-7 N-methyl diethanolamine, N,N-dimethyl ethanolamine, N,N-diethyl cyclohexylamine, N,N,N',N'-tetramethyl-ethylene diamine, 1,4-diaza-bicyclo-[2,2,2]-octane N-methyl-N'-dimethylaminoethyl-piperazine, bis-(N,N-diethylaminoethyl)-adipate, N,N-diethylbenzylamine, pentamethyldiethylene triamine, N,N,N',N'-tetramethyl-1,3-butanediamine, 1,2-dimethylimidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metal organics, such as zinc octoate, phenyl mercuric propionate, lead octoate, lead naphthenate, and copper naphthenate.

Particularly useful, for the present invention, is dibutyltin dilaurate (DBTDL). Useful amounts of catalyst will be about 0.01 to 5%, based on the total weight of the low Tg polyester polyols plus polyisocyanate.

The catalyst may be provided in whole or in part with the mixing clear component or in whole or in part with the hardener component, or may be disposed partly within both the mixing clear and hardener components.

In some embodiments, the basecoat composition will comprise one or more conventional solvents such as ketone, ester, alcohol, glycol ether, and glycol ether ester solvents. Exemplary, non-limiting examples of solvents that may be useful include xylene, n-butyl acetate, t-butylacetate n-butyl propionate, naptha, ethyl 3-ethoxypropionate, toluene, methyl ethyl ketone (MEK), acetone, methyl propyl ketone (MPK), methyl-n-amyl ketone (MAK), propylene glycol methylether acetate (PMA) and the like.

Solvents may be introduced into the basecoat composition as part of the mixing clear component, or the hardener component, or the pigmented toners, or as a separate solvent reducer composition, or one or more of the above. The total amount of solvent used in the basecoat composition may be selected to provide the basecoat with a suitable viscosity for the application method. In some embodiments, it is particularly useful to use exempt solvents.

Additional additives that may be included in the basecoat composition may include UV inhibitors, wetting agents, inert pigments, such as silica, flow agents, defoamers, and the like.

In some embodiments, it will be desirable to provide a colored basecoat composition, which may be achieved by blending with the resin system and hardener of the basecoat composition one or a mixture of two or more pigments. Pigments may be provided by means of pigmented toner resins, which may be conventional pigmented toner resins used in the automotive or aerospace coating industry. Pigmented toner resins typically comprise a solvent, a resin or polymer and one or more pigments. In the present invention, useful pigmented toner resins may comprise one or more resins selected from the group consisting of acrylic resins, polyester resins and blends thereof. Pigments used in the basecoat composition or in the toner resins may comprise standard pigments such as titanium dioxide, carbon black, red oxide and the like, opalescent pigments such as micas, and metallic pigments such as aluminums.

Pigmented toner resins that are particularly useful in the present invention are commercially available under the trademark Genesis® from The Sherwin-Williams Company and ATX available from The Sherwin-Williams Company).

Notwithstanding the particular suitability and convenience of using pigmented toner resins in the basecoat compositions described herein, in some embodiments, it may be useful to blend in dry pigments.

It will be understood that achieving a desired basecoat color may require blending in varying amounts of one or more colored pigments.

The basecoat composition may be applied to a substrate by any conventional means, such as brushing, rolling or spraying. Spray application is particularly useful. The viscosity of the basecoat composition may be adjusted to facilitate spray application.

As discussed above, the elements of the basecoat composition may be provided in two or more separate packages, which may be blended together prior to application. A mixing clear package may comprise a blend of solvents, the low Tg polyesters polyol and thermoplastic resin, and optionally, catalyst. A hardener package may comprise a blend of solvents and the isocyanate functional material. The pigments may be blended into one or both packages, or, more conventionally, may be supplied in separate containers to be selectively blended together with the mixing clear and hardener and, optionally, additional solvents, prior to application.

Clearcoat Composition:

The multilayer coating system of the present invention comprises a clearcoat composition, which may be a substantially transparent solvent borne blend comprising a low Tg linear or branched polyester polyol, at least one other multifunctional polyol; and an isocyanate functional material suitable for crosslinking the polyester polyol.

The clearcoat composition comprises a linear or branched polyester polyol, which may have be a low Tg polyol. Useful polyester polyol resins for the clearcoat may have a hydroxyl number of between about 100 and about 300, and usefully, about 250 to about 300.

Particularly useful are aliphatic polyester polyols including those sold under the Polymac trademark from Hexion Specialty Chemicals.

The clearcoat composition preferably comprises at least one other multifunctional polyol, which may be a di-, tri-, tetra-, or higher functional polyol. Particularly useful are the tri- and tetra-functional polyols. A number of potentially suitable polyols are described above in reference to those polyalcohols suitable for generating the low Tg branched polyester polyol of the basecoat composition.

The multifunctional polyol preferably will have a number average molecular weight in the range of between 100 and about 10,000, and usefully about 750 to about 1500 and a hydroxyl value in the range of 100 to about 300, and usefully, about 150 to about 250 (mg KOH/g). Particularly useful are aliphatic polyester polyols including those sold under the Capa trademark from Perstorp.

As with the basecoat, the clearcoat may comprise the blend of a clearcoat mixing clear component that includes the polyester resin and multifunctional polyol, in additional to one or more solvents, catalysts, and additives, such as the inert pigments, wetting agents, defoamers, and the like, as previously discussed, and a clearcoat hardener component, comprising an isocyanate functional material capable of crosslinking the polyester and multifunctional polyols.

The isocyanate functional material may be any of those described previously in relation to hardener materials useful in the basecoat composition. Hexamethylene diisocyanate is particularly useful.

A catalyst for the isocyanate hydroxyl reaction may be used. One or more of the catalysts previously described in relation to the basecoat composition may be used. The catalyst may be including in the clearcoat mixing clear or hardener components or both.

The clearcoat will preferably comprise a sufficient amount of the isocyanate functional material to provide an NCO:OH ratio in the range of 0.8:1.0 to 3:1, and usefully, 1.0:1.0 to about 1.5:1.0.

The viscosity of the clearcoat composition may be adjusted by addition of a solvent reducer, which may comprise one or a blend of more than one organic solvent, such as those previously described.

The topcoat composition may be prepared in the manner of conventional 2K coatings, by blending the elements of the composition together prior to application, or in another embodiment, blending the mixing clear composition with the hardener composition, and optional reducer solvent blend, prior to application. The topcoat may be applied may any conventional means, including brushing, rolling and spraying.

Application of Basecoat Clearcoat System

The basecoat clearcoat system of the present invention is particularly useful to provide a multilayer decorative and protective coating on metal substrates, such as aluminum, and particularly treated metal substrates. However, the system may be applied to substrates of other materials, such as wood and plastic.

The basecoat compositions of this invention are compatible with a number of commercially available primers, sealers, and surfacers.

The basecoat and clearcoat formulations described herein are particularly formulated to provide excellent inter-coat adhesion, particularly between the clearcoat and the basecoat, though basecoat to basecoat adhesion is also anticipated to be very good. The basecoat composition is formulated to provide a suitably long open time to facilitate application over large substrates. However, the basecoat balances the open time with a desirable dry time to facilitate timely application of multiple basecoat layers.

The basecoat and clearcoat compositions are also particularly formulated to provide excellent intercoat adhesion between the clearcoat and basecoat layers even after a substantial time delay between application of the clearcoat layer on the basecoat layer. Application of the clearcoat layer may occur up to 6, 12, 24, 36, 48, 60 or 72 hours after application of the basecoat layer and still yield excellent adhesion.

EXAMPLES

Example 1

Preparation of Polyester Polyol

To a 3-liter reactor, which was equipped with stirrer, thermocouple, packed column, condenser, water receiver and nitrogen inlet, a mixture of 836.1 g of trifunctional caprolactone polyol (Capa 3031), 187.0 g of 1,3/1,4-cyclohexanedimethanol (Unoxol™ Diol from Dow Chemicals), 264.9 g of 3-Hydroxy-2,2-Dimethylpropyl 3-Hydroxy-2,2-Dimethylpropanoate (HPHP glycol), 412.0 g of hexahydrophthalic anhydride (HHPA), and 0.49 g of butyl stanoic acid was charged. The reaction temperature was gradually increased to 210° C. under nitrogen while removing water. The mixture was then held at 210° C. until the acid value reached 5.0 mg KOH/g solid. The reaction solution was cooled to 130° C. and reduced with 550.0 g of methyl amyl ketone. The polyester had a solid content of 70.0%, acid value of 4.2 mg KOH/g solid, weight per gallon of 8.59 lb/gal, viscosity of H~I, OH value of 297 mg KOH/g solid, Gardner color of 0.2, Tg of −33° C., molecular weight of Mn 905, Mw 1516, Mz 2352 and Pd 1.67.

Example 2

Preparation of Polyester Polyol

To a 5-liter reactor, which was equipped with stirrer, thermocouple, packed column, condenser, water receiver and nitrogen inlet, a mixture of 460.5 g of trifunctional caprolactone polyol (Capa 3031), 513.17 g of 1,3/1,4-cyclohexanedimethanol (Unoxol™ Diol from Dow Chemicals), 727.6 g of 3-Hydroxy-2,2-Dimethylpropyl 3-Hydroxy-2,2-Dimethylpropanoate (HPHP glycol), 1098.3 g of hexahydrophthalic anhydride (HHPA), and 0.8 g of butyl stanoic acid was charged. The reaction temperature was gradually increased to 210° C. under nitrogen while removing water. The mixture was then held at 210° C. until the acid value reached 5.0 mg KOH/g solid. The reaction solution was cooled to 130° C. and reduced with 800.0 g of methyl amyl ketone. The polyester had a solid content of 75.6%, acid value of 1.8 mg KOH/g solid, weight per gallon of 8.70 lb/gal, viscosity of W~X, OH value of 107 mg KOH/g solid, Gardner color of 0.3, Tg of −1.5° C., molecular weight of Mn 1604, Mw 3276, Mz 5793 and Pd 2.04.

Example 3

Preparation of Basecoat

To a 1-liter metal can, which was equipped with an air mixer with a Cowles blade, 364.50 grams of resin from Example 1 above, 10.17 grams of Shersperse-S dispersant resin (a proprietary dispersant of The Sherwin-Williams Company) and 38.39 grams of n-butyl acetate were charged and mixed for 10 minutes. To the above resin solution, 309.74 grams of titanium dioxide (R-706 from DuPont) were sifted in slowly under shear. After all the pigments were in, the Cowles blade was run at high shear for 60 minutes. Then, 60.80 grams of n-butyl acetate was added followed by 0.41 grams of dibutyltin dilaurate. The mixture was subject to shear for 10 minutes following the last addition.

To make a ready-to-use basecoat paint, 105.56 grams of isocyanate (Tolonate HDT100 LV from Perstorp) may be added and the blend further reduced, as necessary with a commercial reducer (US2 from The Sherwin-Williams Company).

Example 4

Preparation of Basecoat Mixing Clear

To a 1-liter metal can, which was equipped with an air mixer with a Cowles blade, 384.00 grams of resin from Example 2 above, 68.09 grams of n-butyl propionate were charged and mixed for 10 minutes. To the above resin solution, 75.78 grams of amorphous silica (Syloid C2006 from W.R. Grace) were sifted in slowly under shear, then 17.66 grams of thermoplastic acrylic (Paraloid A-21 from Rohm & Haas, Co.) were added. The Cowles blade was run at high shear for 60 minutes. Then, 6.39 grams of UV light absorber (Tinuvin 384 from BSAF), 36.45 grams of 2,4-pentanedione, 1.54 grams of dibutyltin dilaurate, and 89.60 grams of acetone were added under shear.

Example 5

Preparation of Basecoat from Mixing Clear

To make a ready-to-use basecoat paint from mixing clear, blend 150.00 grams of mixing clear in Example 4 with 187.5 grams of white color toner (GT1011 from The Sherwin-Williams Company), 31.36 grams of isocyanate (Tolonate HDT100 LV), and further reduced with a commercial reducer (US2 from The Sherwin-Williams Company).

Example 6

Preparation of Clearcoat

A clearcoat composition may be prepared by blending of 112.0 g of Polymac HS220-2215, 36.0 g of CAPA 4101, 21.8 g of methyl n-amyl ketone, 21.8 g of n-butyl propionate, 7.2 g of Tinuvin 5350, 1.2 g of a wetting agent, 3.0 g of dibutyltin dilaurate, 110.2 g of Tolunate HDT100 LV, and 106.3 g of the reduser US4 from The Sherwin-Williams Company.

The basecoats in Examples 3 and 5 were sprayed separately over primed aluminum panels with a dry film build of 37.5 microns. After 2 hours flash off, the clearcoat in Example 6 was sprayed on top of the respective basecoats to achieve a dry film build of 50 microns. The paint system was cured at ambient condition for 14 days before testing. The coated systems demonstrated excellent flexibility, impact, hydraulic fluid, and rain erosion resistance.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A 2K solvent borne coating composition comprising:
   (a) A resin system comprising a polyester polyol having a Tg of between about −40° C. to about 20° C. and an OH functionality of between about 2 and about 5, which is the esterification reaction product of a monomer blend comprising:
      (i) a linear, difunctional glycol or ester glycol;
      (ii) a cyclic diol;
      (iii) a multi-functional polycaprolactone; and
      (iv) a cyclic dicarboxylic acid or anhydride;
   (b) an isocyanate functional material suitable for crosslinking the polyester polyol; and
   (c) optionally, one or more pigments.

2. The coating composition of claim 1, wherein the resin system consists essentially of the polyester polyol.

3. The coating composition of claim 1, wherein the polyester polyol has a hydroxyl value of 50 to about 300.

4. The coating composition of claim 1, wherein the resin system further comprises a high molecular weight thermoplastic resin having a Tg of between about 25° C. to 110° C.

5. The coating composition of claim 4, wherein the thermoplastic resin is selected from the group consisting of thermoplastic acrylic resins, cellulose esters, and blends thereof.

6. The coating composition of claim 5, wherein the thermoplastic resin has a molecular weight of between about 5,000 and 250,000.

7. The coating composition of claim 1, wherein the resin system further comprises up to about 60% with respect to total resin weight of a thermoset acrylic resin.

8. The coating composition of claim 1, wherein;
   (i) comprises HPHP;
   (ii) is selected from the group consisting of 1,3-CHDM, 1,4-CHDM, and blends thereof; and
   (iv) is selected from the group consisting of HHPA, CHDA and blends thereof.

9. The coating composition of claim 8, wherein the polycaprolactone comprises from 5 to about 65% of the total monomer weight of the monomer blend.

10. The coating composition of claim 1, further comprising a catalyst for the isocyanate polyol reaction.

11. A basecoat/clearcoat coating system comprising:
   A. A 2K solvent borne basecoat composition comprising:
      1. a mixing clear component comprising:
         (a) a polyester polyol having a Tg of between about −40° C. to about 20° C. and OH functionality of between about 2 and about 5, said polyester polyol comprising the esterification reaction product of a monomer blend comprising:
            (i) a linear, difunctional glycol or ester glycol;
            (ii) a cyclic diol;
            (iii) a multi-functional polycaprolactone; and
            (iv) a cyclic dicarboxylic acid or anhydride; and
         (b) a thermoplastic resin having a Tg of between about 25° C. to 110° C.;
      2. a hardener component comprising an isocyanate functional material suitable for crosslinking the polyester polyol; and
      3. optionally, one or more pigmented toner resins; and
   B. a 2K clearcoat composition comprising:
      1. a resin component comprising:
         (a) a low Tg linear or branched polyester polyol or blends thereof, wherein said low Tg linear or branched polyester polyol has a Tg of between about −40° C. to about 20° C.; and
         (b) at least one other multi-functional polyol; and 2. an isocyanate functional material suitable for crosslinking the polyester and multi-functional polyols.

12. The coating composition of claim 11, wherein:
(i) comprises HPHP
(ii) is selected from the group consisting of 1,3-CHDM, 1,4 CHDM, and blends thereof; and
(iv) is selected from the group consisting of HHPA, CHDA and blends thereof.

13. The coating composition of claim 11, wherein the thermoplastic resin is selected from the group consisting of thermoplastic acrylic resins, cellulose esters, and blends thereof.

* * * * *